United States Patent [19]

Laws et al.

[11] Patent Number: 5,072,399

[45] Date of Patent: Dec. 10, 1991

[54] MACHINE TOOL CONTROL

[75] Inventors: Arnold M. Laws, Rugby; Christopher R. Barnes, Kenilworth, both of Great Britain

[73] Assignee: T&N Technology Limited, Warwickshire, England

[21] Appl. No.: 397,785

[22] Filed: Aug. 24, 1989

[30] Foreign Application Priority Data

Sep. 3, 1988 [GB] United Kingdom ............. 8821696

[51] Int. Cl.⁵ ............................................. G06F 15/46
[52] U.S. Cl. ........................ 364/474.29; 364/474.02; 364/474.28; 82/118
[58] Field of Search .................. 364/474.01, 474.15, 364/474.17, 474.28, 474.29, 167.01, 180; 82/118, 1.11, 11.1; 341/122, 123; 318/636

[56] References Cited

U.S. PATENT DOCUMENTS

| 3,595,106 | 7/1971 | Pomella et al. | 364/474.31 |
| 4,206,009 | 6/1980 | Kazares | 156/130 |
| 4,577,535 | 3/1986 | Klabunde et al. | 82/118 |
| 4,653,360 | 3/1987 | Compton | 82/18 |
| 4,817,007 | 3/1989 | New | 364/474.01 |

FOREIGN PATENT DOCUMENTS 0132341 1/1985 European Pat. Off. .
8700646 1/1987 PCT Int'l Appl. .

OTHER PUBLICATIONS

IBM Technical Disclosure Bulletin, vol. 30, No. 12, May 1988, New York U.S., pp. 409–412, "Accurate Velocity Digital Position Feedback System for Robotics and Tool Control".

Primary Examiner—Charles E. Atkinson
Assistant Examiner—Paul Gordon
Attorney, Agent, or Firm—Nixon & Vanderhye

[57] ABSTRACT

A system for machining a piston blank to a predetermined profile includes means for rotating a blank at a predetermined speed and means for moving a tool axially with reference to the blank. Digital processing means receives input data defining the required profile (or part only of the profile if the profile is symmetrical). In response to this data, to digital information on a channel corresponding to the instantaneous angular position of the blank, and to digital data on another channel corresponding to the instantaneous axial position of the tool, the processor outputs digital data defining the required position of the tool in the direction perpendicular to the surface of the blank in order to produce the required profile. The actuator control processor outputs a corresponding digital signal which, via a digital-to-analog converter, drives a tool actuator so as to position the tool correspondingly. The processor also receives digital tool position feedback signals on a channel and an adaptive control loop senses and compensates for changes in the transfer function between the input of the processor and the tool. Sensors sense dimension distortion and temperature changes, respectively, of the blank and produce corresponding compensating changes in the digial output signals.

23 Claims, 4 Drawing Sheets 5,072,399

1

MACHINE TOOL CONTROL

FIELD OF THE INVENTION

The invention relates to machine tool control, and more specifically to the control of the machining of work pieces by a machine tool in which the tool and the workpiece rotate relatively to one another to produce a shaped profile on the workpiece. The invention has particular applicability to the machining of pistons.

BACKGROUND OF THE INVENTION

An example of a machine tool control system is shown in U.K. patent specification No. 2143968 corresponding to U.S. Pat. No. 4,672,550. In this system the tool is controlled by a digital computer which produces digital signals corresponding to the tool positions necessary to form the required profile on the workpiece. The system disclosed, however, is only partly digital. The digital signals are converted into analogue form for controlling the tool position and the system incorporates an analogue feedback loop responsive to analogue signals dependent on the position of the tool. Such a system has the disadvantages inherent in its use of analogue signals. It is an object of the present invention to provide a machine tool control system having the full advantages of digital systems (simpler processing, greater accuracy and freedom from drift).

SUMMARY OF THE INVENTION

According to the invention, there is provided a machine tool control system for machining a surface of a workpiece rotating about an axis to a predetermined profile changing in two mutually perpendicular dimensions, comprising a workpiece drive for rotating the workpiece at a speed of at least 3000 RPM, angular position sensing means for producing successive angular position signals representing respective angular positions of the workpiece, a tool for machining the workpiece and movable in a first one of said two mutually perpendicular dimensions towards and away from the workpiece and movable in the second one of said two mutually perpendicular dimensions across the surface of the workpiece, first tool drive means for moving the tool in the first dimension, second tool drive means for moving the tool in the second dimension, second dimension position sensing means for producing a succession of second dimension position signals representing respective positions of the tool in the second dimension, digital data processing means having a portion for producing from input digital data fed thereto a succession of digital output signals respectively defining successive positions of the tool in the first dimension, each such digital output signal corresponding to a respective one of the angular position signals and a simultaneously existing one of the second dimension position signals, and the successively defined position of the tool in the first dimension being the tool positions in that dimension required for producing the said predetermined profile on the workpiece, output means responsive to the digital output signals for producing tool drive signals, and means feeding the tool drive signals to the first tool drive means for moving the tool correspondingly in said first dimension, the tool drive signals changing discretely in value, and the successive angular position signals occurring at a frequency which is between 20 and 50 times the bandwidth of the tool drive means.

2

For convenience, in this specification, and the accompanying claims, the term "changing discretely in value" is employed to describe tool drive signals which are digital or binary in form; or which comprise a train of pulses having a parameter associated therewith, for example, their widths, modulated in dependence upon appropriate respective values; or which have amplitudes obtained by sampling at discrete time intervals, for example, signals of the form obtained from a digital-to-analogue converter, and which are capable of being distinguished from analogue signals, continuous in form, and not having been obtained by sampling.

The successive angular position signals may be produced at such a frequency in relation to the rotational speed of the workpiece as respectively to represent one degree angular intervals.

Said frequency of the angular position signals may be of the order of 20 Kilohertz.

The bandwidth of the tool drive means may be of the order of 400 Hertz.

Position feedback means may be included in the system for sensing the instantaneous position of the tool in the first dimension and producing a position feedback signal to said portion of the data processing means. The feedback signals may be digital signals; and in such an arrangement said portion of the data processing means may comprise parallel processing means of sufficient data processing power to respond directly and digitally to the digital feedback signals.

According to the invention, there is also provided a method of machining a surface of a workpiece rotating about an axis to a predetermined profile changing in two mutually perpendicular dimensions comprising the steps of holding the workpiece and rotating it about the axis, measuring its instantaneous angular position, moving a tool in a first one of the said two mutually perpendicular dimensions towards and away from the workpiece and moving the tool in the second one of said two mutually perpendicular dimensions across the surface of the workpiece, measuring the instantaneous position of the tool in the first dimension, measuring the instantaneous position of the tool in the second dimension, digitally processing input data defining the predetermined profile to produce a succession of digital output signals respectively defining successive positions of the tool in the first dimension, each such digital output signal corresponding to a respective angular position and a simultaneously existing position of the tool in the second dimension, and the successively defined positions of the tool in the first dimension being those required in order to machine the said predetermined profile, the step of producing the digital output signals being carried out in direct digital dependence on the angular position of the workpiece and on the position of the tool in at least the second dimension.

BRIEF DESCRIPTION OF THE DRAWINGS

Machine tool control systems and methods according to the invention will now be described, by way of example only, with reference to the accompanying drawings in which.

DETAILED DESCRIPTION OF THE DRAWINGS

Figure 1:
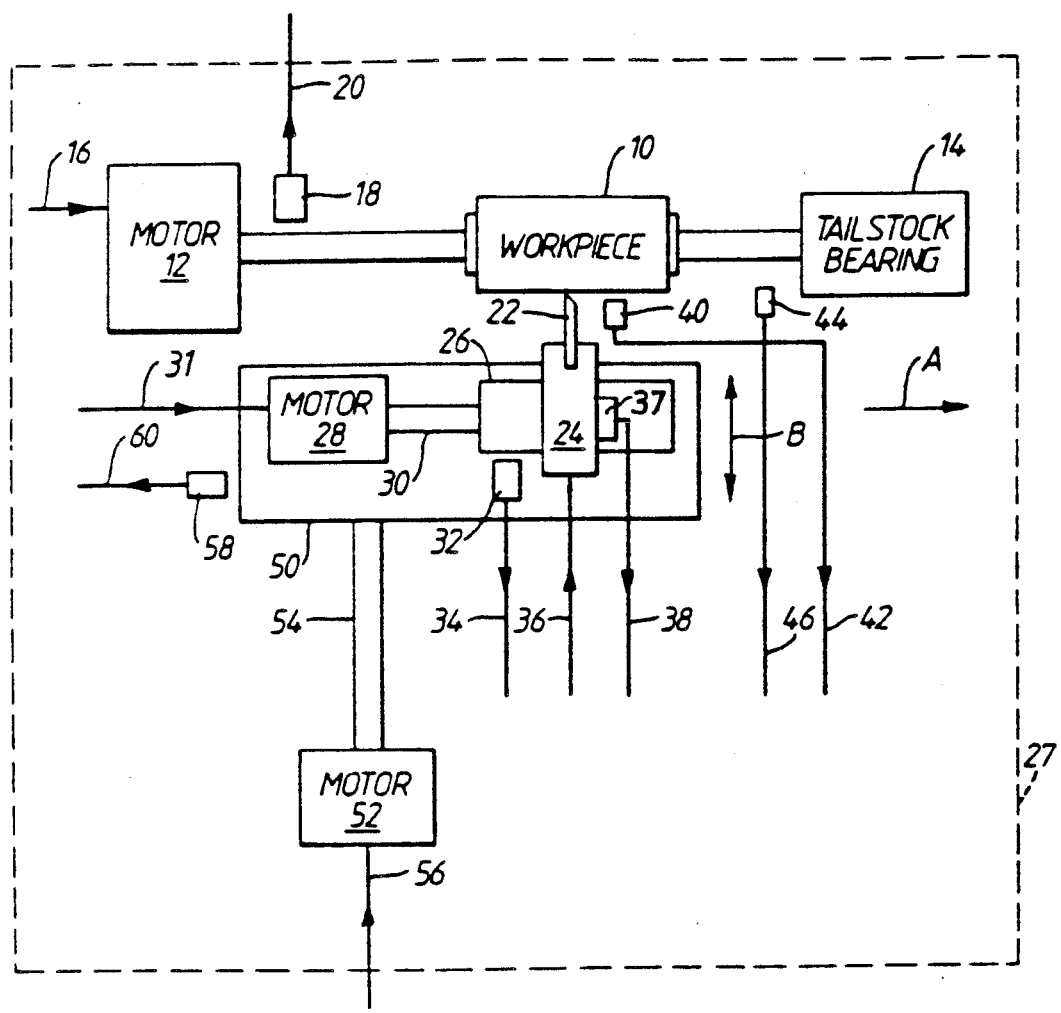
FIG. 1 is a plan view diagrammatically showing the mechanical lay out of the systems.

As shown in FIG. 1, a generally cylindrical workpiece 10 is mounted for rotation by means of an electrical spindle motor 12 and supported by a tail stock bearing assembly 14.

The workpiece 10 may be a generally cylindrical blank such as an aluminium or aluminium alloy piston blank.

The workpiece is to be machined to have a required profile. The profile may be non-cylindrical. For example, the piston may be required to be of oval or elliptical cross-section with the cross-sectional dimensions varying along the axial length of the workpiece to produce a "barrelling" effect. Additionally or alternatively, the piston may be required to have a plurality of raised surface portions. The degree of ovality or barrelling and the height of the raised surface areas over the adjacent surfaces will be very small indeed, of the order of only a few or tens of microns. Normally, the piston will have a relatively solid crown from which the piston skirt depends, the piston skirt being relatively thin and embracing or partially embracing the hollow interior of the piston. The effect of this on the machining operations to be described will be referred to later.

The workpiece 10 may be mounted in the machine tool in any suitable way. One possible way is shown in U.S. Pat. No. 4,621,546.

The speed of the motor 12 is controlled by signals on a control channel 16. A suitable encoder or sensing device 18 detects the instantaneous angular position of the motor drive shaft and thus of the workpiece 10 and produces a corresponding output signal on a control channel 20.

The machining of the workpiece 10 is carried out by a tool 22. This tool is advanced towards the workpiece, or retracted therefrom, (in the directions of the arrows B), by means of an actuator 24 to be described in more detail below. The actuator 24 is fixedly mounted on a slide 26, the slide being constrained for sliding movement in the direction of the arrows A, relative to the machine base shown dotted at 27, under control of a "Z-slide" motor 28 driving the slide 26 through a lead screw 30. The motor is controlled by signals on a control channel 31. A suitable sensor 32 detects the instantaneous position of the slide 26 (that is, the instantaneous position of the tool 22 along the axis of the workpiece 10) and produces a corresponding output signal on a control channel 34.

Actuator 24 is controlled by a control signal on a control channel 36. Signals produced by a transducer 37, and representing the instantaneous position of the tool 22, in the direction normal to the axis of the workpiece 10, are produced on a control channel 38.

As explained above, the workpiece 10 may have a relatively thin depending piston skirt. At high speeds of rotation of the workpiece, which are necessary in order to provide high machining speed, the skirt portions may be distorted by centrifugal force, that is, distorted outwardly. The amount of this distortion will of course be very small. Nevertheless, it may be significant in terms of the machining operations. In order to enable it to be taken into account in the machining operations, in a manner to be more specifically described, a sensor 40 is provided which senses for this distortion and produces a corresponding output signal on a channel 42.

A temperature sensor 44 senses the temperature in the region of the workpiece 10 and produces a corresponding output signal on a channel 46. The sensor 44 may advantageously sense the temperature of the coolant used in the machining process whose temperature will equate to that of the workpiece 10.

Therefore, in a manner to be more specifically described, the motor 12 rotates the workpiece 10 at high predetermined speed. The motor 28 advances the slide 26 in the direction of the arrow A. During this process, the actuator 24 adjusts the position of the tool 22 in the direction of the arrow B. The positioning of the tool 22 in the direction of the arrow B is automatically controlled, in a manner to be described, so that an appropriate cut is taken from the workpiece 10 as required by the desired profile of the workpiece, taking into account the instantaneous position of the slide 26 (as indicated by the signals on the channel 34) and the instantaneous angular position of the workpiece 10 (as indicated by the signals on the channel 20).

The slide 26 carrying the actuator 24, together with the motor 28, are mounted on a X-slide 50 which is mounted for sliding movement in the directions of the arrows B, this being controlled by a motor 52 driving through a lead screw 54. Signals for controlling the motor 52 are fed in on a control channel 56. A sensor 58 detects the instantaneous position of the slide 50 and produces output signals on a channel 60. Movement of the slide 50 is normally carried out infrequently and only if necessary to enable relatively large changes in profile on the workpiece 10 to be machined. Normally, the movement of the tool 22 under control of actuator 24 is sufficient.

The input and output signals shown in FIG. 1 are digital signals. If the various sensors in fact develop their signals in analogue form, they are converted into digital form.

Figure 2:
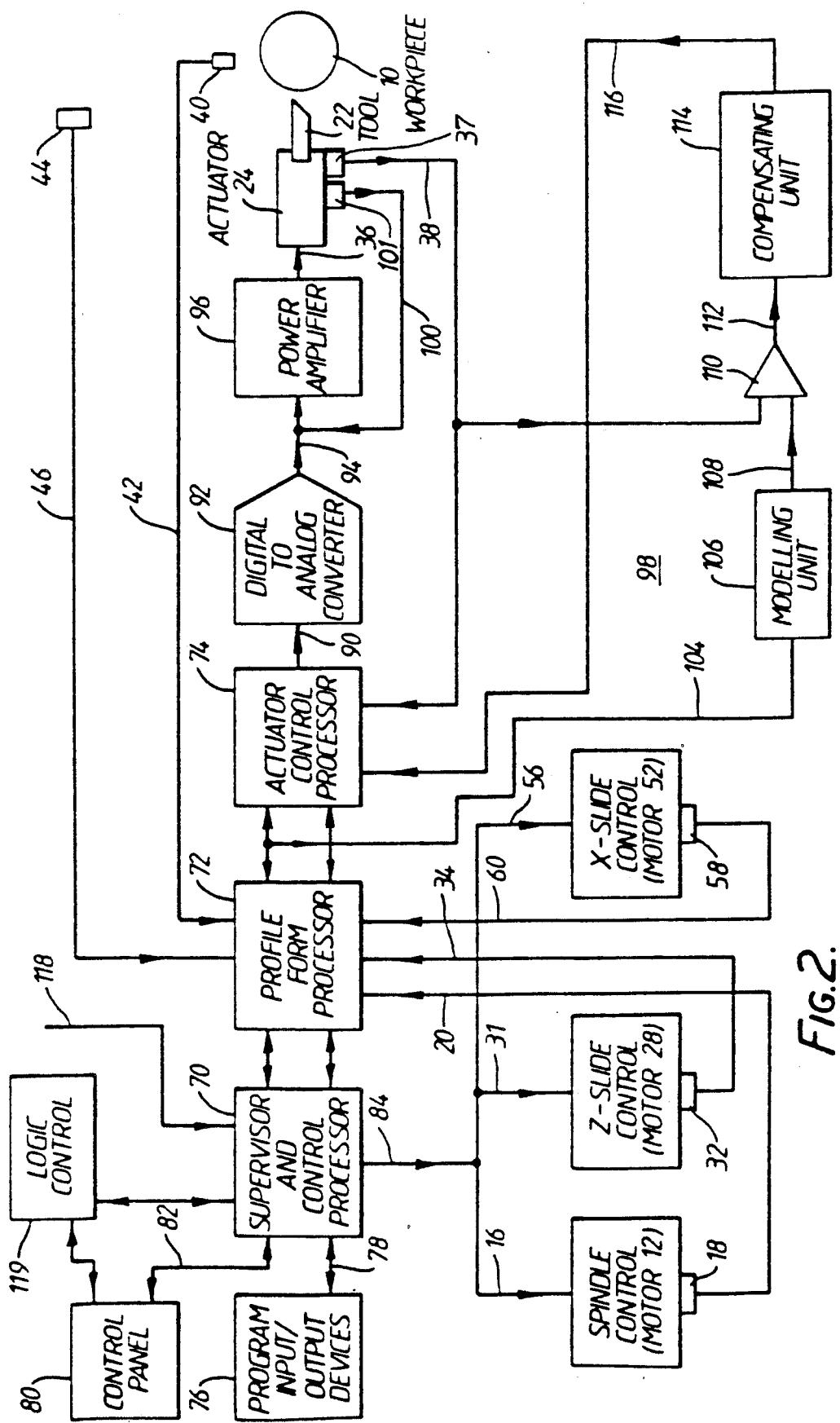
FIG. 2 is a block circuit diagram of one of the systems.

In FIG. 2, parts corresponding to those in FIG. 1 are correspondingly referenced.

The system of FIG. 2 is computer-controlled. The system incorporates digital data processing hardware providing, in this example, three processor blocks, a supervisor and control processor 70, a profile form processor 72 and an actuator control processor 74. The three processors are operatively interconnected, there being two-way communication channels both between the supervisor and control processor 70 and the profile form processor 72; and between the profile form processor 72 and the actuator control processor 74. These three processors may be embodied as three physically separate items of hardware such as suitable microprocessors. Instead, however, they may be implemented as functionally identifiable parts of software controlling a single item of hardware.

Prior to carrying out a machining process, input profile data is prepared which defines the required profile of the workpiece at a succession of angular positions around the workpiece and at a succession of axial positions along the workpiece. Angularly, the profile may be defined at intervals around the workpiece 10 as "drops" or decreases from a nominal maximum radius. These angular intervals may, for example, be 5, degree 2.5 degree or 1 degree or at other intervals. The maximum drop may be, say, between 1 and 5 millimeters in steps of 0.125 microns.

The profile data defining the desired profile is prepared and fed into the supervisor and control processor 70 by means of a suitable programme input/output device 76 and a channel 78. The block 76 may be implemented by a paper tape unit, a floppy disc or by direct input from a suitable CAD/CAM system. The profile data is fed to the profile form processor 72 where it is stored.

It will be appreciated, however, that it is not necessary for profile data defining the entire profile of the piston to be pre-prepared and fed in in this way. If the workpiece is symmetrical with reference to one or more planes including the axis of rotation of the workpiece, it is only necessary to define the input data for one such symmetrical portion: the profile form processor 72 can calculate the profile data for the other symmetrical portion(s). For example, where the cross-section is to be elliptical, only input data for a 90 degree segment of the ellipse between the two planes of symmetry need be initially defined. In addition, a cross-sectional profile need only be defined at those axial intervals where there is a non-linear change in the profile or the rate of change of the profile.

The system is set into operation by means of the control panel 80 and control channel 82. In response to this, the supervisor and control processor 70 produces suitable control signals on an output control channel 84. These signals energise channel 16 (see FIG. 1) for setting the spindle motor 12 into operation at the required speed. In addition, the signals energise control channel 31 so as to cause the Z-slide motor 28 to position the Z-slide 26 in the correct initial location. Finally, the signals energise control channel 56 so as to cause the X-slide motor 52 to position the X-slide 50 in the correct initial position. The sensors 18, 32 and 58 produce corresponding output signals indicating (a) the instantaneous angular position of the workpiece 10 (which is of course varying as the motor 12 is rotating), (b) the instantaneous position of the slide 26, and (c) the instantaneous position of the slide 50. Corresponding signals are fed on channels 20, 34 and 60 to the profile form processor 72. The X-slide 50 will, as already explained, move relatively infrequently. Thus, the processor 72 is primarily concerned with the inputs from sensors 18 and 32. As the workpiece 10 continues to rotate, and the slide 26 to move in the direction of the arrow A (FIG. 1), the processor 72 selects the appropriate control data from its store (being pre-calculated data or data which it has itself calculated in the manner explained above) and, in a manner to be described in more detail, feeds this to the actuator control processor 74. The latter causes actuator 24 to position the tool 22 in the correct position so as to take the required cut from the workpiece at that instantaneous position on its surface.

As indicated above, the sensor 18 may measure the instantaneous angular position of the workpiece 10 at one degree intervals. It may be desirable in practice to adjust the position of the tool 22 at smaller intervals than this. The measurement of such smaller intervals may not be practicable. Therefore, the profile form processor 72 may carry out an interpolation process so as itself to generate signals representing angular increments smaller than those which can conveniently be measured by the sensor 18—carrying out this interpolation process on the assumption that the spindle speed remains constant between successive signals received from sensor 18. In this way, therefore, it can output control signals for the actuator 24 at intervals corresponding to, say, every 0.5 degree or every 0.25 degrees.

The angular position signals received by processor 72 (whether from sensor 18 or internally generated by interpolation) act as "interrupt" signals. The processor 72 responds to each angular interval signal by outputting the corresponding control signal for actuator 24 and then waits for the next "interrupt" signal (the next angular interval signal) before outputting the next control signal. Each control signal, in addition to corresponding to a respective one of the angular position signals, also corresponds to a simultaneously existing one of the Z-slide position signals on channel 34.

The profile form processor 72 also receives the signals from the distortion and temperature sensors 40 and 44 (FIG. 1) and responds in a manner to be described.

As so far described, the system is entirely digital and the control signals outputted to the actuator control processor 74 are in the form of digital numbers representing the desired position of the tool 22.

The purpose of the actuator control processor 74 is to respond to the input control signal and to produce an appropriate digital output on a channel 90 so as to position the tool 22 correctly, having regard to its previous position and other factors to be described. The digital output signal on line 90 is fed into a digital to analogue converter 92 and the corresponding output on line 94 is amplified in a power amplifier 96 and is fed on line 36 (see FIG. 1 also) to the actuator 24. Thus, the tool drive signals change discretely in value, in a manner corresponding to that of digital, or binary, signals, having amplitudes obtained by sampling at discrete time intervals; and are distinguishable from analogue signals, continuous in form, and not having been obtained by sampling.

The output on line 38 (see FIG. 1), representing the instantaneous position of the tool, is fed back to the actuator control processor 74 and in this way the processor 74 is able to calculate, from the digital input received from the processor 72 and the digital feed back signal on control channel 38, the required digital output on channel 90.

The control circuit for the actuator 24 also includes an adaptive control loop 98 to be described.

In order to maximize production of machined parts, it is necessary for the workpiece to be machined at high speed, that is, the speed of rotation of the workpiece has to be high—say 3,000 rpm. In addition, however, very high machining accuracy is required and, as stated, it is desirable for the output data from the processor 72 to be outputted at very small angular intervals, as small as 0.25 degrees for example. The actuator control processor 74 has to function in a correspondingly rapid manner. Thus, it must sample the tool position feedback signal on channel 38 at sufficiently frequent intervals to enable it to produce the required digital output on channel 90 at the required frequency and with high accuracy. All these requirements necessitate very powerful, fast and accurate data processing in view of the extremely large amount of data which has to be handled and the speed at which it has to be handled. The required accuracy can be achieved by using 32-bit processing; 8 or 16-bit processing will produce unacceptable quantization noise. The required data processing speed can be achieved by breaking the functions down and carrying out as many as possible of them in parallel. This necessitates the use of a sufficient amount of data processing hardware. Devices such as the Motorola P56000 and the Texas Instruments TMS 320 could be used for the profile form processor 72 and the actuator control processor 74 respectively.

Advantageously, parallel operation is achieved by using transputers.

The operations to be carried out by the data processing part of the system are advantageously divided into time-critical and non-critical operations. Time-critical operations in the system include the calculations carried out by the profile form processor 72 and the outputting of the control data to the actuator control processor 74 at the required angular intervals. They also include the actions carried out by the actuator control processor 74 in sampling the position feed back signals on channel 38 and producing the required digital control data on channel 90. Time-critical functions could be written in assembly language. Non-critical operations include general system supervision as carried out by the supervisor and control processor 70, and the response of the profile form processor 72 to the distortion and temperature signals received on channels 42 and 46, and the response of the actuator control processor 74 to the adaptive control loop 98. Greater data processing power is thus provided for the time-critical operations than for the non-critical operations. Furthermore, the system may be programmed so that hardware employed primarily on non-critical operations can, when its operations permit, be temporarily used to carry out time-critical functions.

As already explained, the high speed of rotation of the workpiece 10 may cause dimensional distortion. This is sensed by sensor 40 and corresponding output signals produced on channel 42. Changes in workpiece temperature will also alter its size and possibly its shape and such changes in temperature are sensed by sensor 44 and corresponding outputs produced on channel 46. The signals on channels 42 and 46 and fed to the profile form processor 72 which therefore adjusts its digital control output so as to compensate. For example, temperature changes may be accommodated by applying a scaling factor to the digital output. This may also be done to compensate for dimensional changes sensed by sensor 40 although these dimensional changes will, normally, affect part, only, of the profile of the workpiece.

The distortion measurement carried out by sensor 40 need not be carried out continuously; this is not necessary because it can be assumed that the amount and position of any distortion will be constant for a particular type of piston running at a particular rotation or speed. Therefore, when there is a change in the type of piston being machined, a sample of such a new piston can be run up to speed and its distortion measured at different axial positions by means of sensor 40. The resultant outputs on channel 42 are then fed into the profile form processor 72 and stored therein for use in the manner described.

In order to improve accuracy and stability of control of the tool position, a velocity feedback loop 100 may be provided. As shown in FIG. 2, this is entirely analogue in form. A signal representing the instantaneous speed of movement of the tool 22 is generated by a transducer 101 within actuator 24 and fed back to the input of the power amplifier 96 on line 100. Instead, however, digital velocity feedback could be employed. In such a case, line 100 would be omitted but a digital velocity signal would be generated in and by the actuator control processor 74 by sensing the rate of change of the position signal on channel 38.

The actuator 24 may take any suitable form. The tool must be positioned with extremely high accuracy and the moving parts of the actuator need to have a low inertia for rapid response. The actuator may employ a high torque rotary motor with a suitable mechanism for converting the rotary movement into linear movement.

Alternatively, a linear motor may be used and this may be of the moving coil or moving magnet type.

Although the actuator/tool assembly is required to have a low inertia, there may nevertheless be an unavoidable small time-lag in its response to a required change in position. In order to take account of this, the profile form processor 72 and the actuator control processor 74 can be arranged to produce their output signals with a suitable time offset (hat is, in advance of the theoretically correct time) to compensate.

In order to take account of changes which may inevitably occur in the amount of such time lag and/or to take account of other factors which may alter the total transfer function between an input signal to the actuator control processor 74 and the resultant movement of the tool 22 the adaptive control loop 98 is provided. The adaptive control loop has an input line 104 which receives the input signals from the profile form processor 72 to the actuator control processor 74. These input signals are fed into a modelling unit 106. Modelling unit 106 is a unit having a transfer function which is equal to the nominal transfer function of the control loop between the actuator control processor input and the tool movement. In other words, in response to a specific input signal on channel 104, the modelling unit 106 produces an output on a line 108 representing the change in position of the tool 22 which should take place in response to that control input provided that the transfer function of the tool position control loop remains at the nominal value. This output is fed into one input of a comparator 110.

The modelling unit 106 may take any suitable form. It may be implemented in hardware such as by a suitable resistance/capacitance circuit. Instead, it may be implemented in software.

The second input to the comparator 110 is the signal on line 38 representing the actual tool position.

Therefore, the comparator 110 compares the actual change in position of the tool 22 in response to a particular input to the actuator control processor 74 with the change in tool position which should take place if the transfer function of the tool position control loop is unchanged from the nominal value. Any error is produced on a line 112 and fed to a compensating unit 114. The compensating unit responds to any error signal by outputting a compensating signal on line 116 which is fed back to the actuator control processor 74 and ensures that the digital output on line 90 is adjusted as necessary to take account of the fact that the transfer function of the tool position control loop has changed. The compensating unit 114 could take the form of a look-up table.

The adaptive control unit 98 is preferably entirely digital in operation. Normally, it would not be operative continuously but would be brought into operation at specific intervals such as by the supervisor and control processor 70. For example, it could be rendered operative once at the beginning of each working shift.

In order to check on the correct operation of the total system, samples of machined pistons may be subjected to accurate dimensional checks (by separate gauging systems). The resultant inputs can be fed into the supervisor and control processor 70 by means of channel 118. In this way, if there is a change in the finished dimension of the piston, such as a dimensional drift caused by tool wear for example. this can be taken into account; thus, the processor 70 can make a corresponding adjustment to the output data.

A logic control unit 119 controls the basic operating functions of the processor blocks and, by freeing them from the necessity of carrying out these functions themselves, increases their data processing power.

Figure 3:
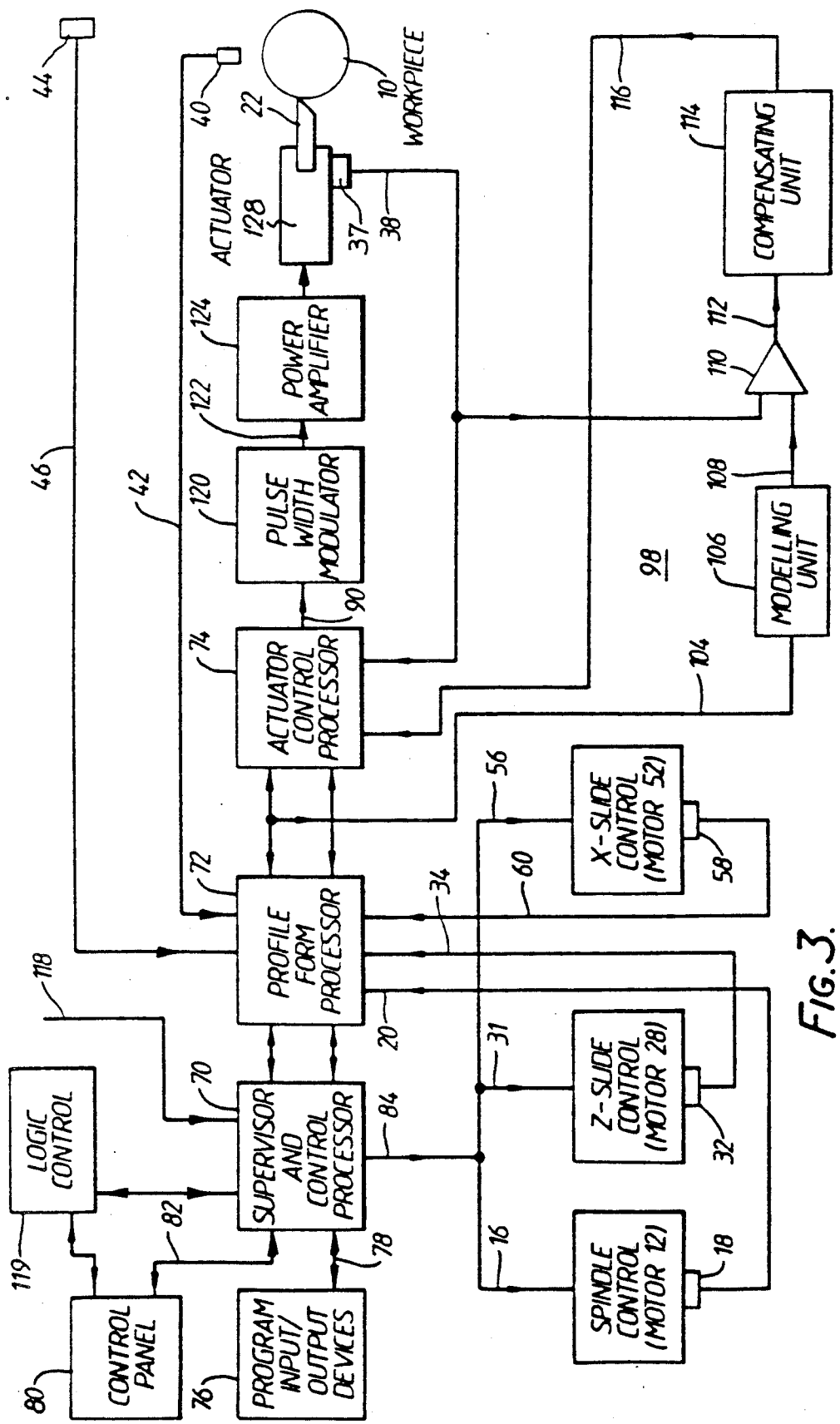
FIG. 3 is a block circuit diagram of a modified form of the system of FIG. 2.

In FIG. 3, items corresponding to those in FIGS. 1 and 2 are similarly referenced. The system of FIG. 3 differs from the system of FIG. 2 in that there is no digital-to-analogue convertor 92. The digital output from actuator control processor 74 on channel 90 is fed into a pulse width modulator 120 which produces on an output line 122 a pulsed output at a fixed pulse repetition frequency corresponding to the clock rate of the digital signals on line 90. However, the pulse width of the pulses on line 122 depends on the magnitude of the digital input signal on channel 90. The pulse train on line 122 is fed into a power amplifier 124 which may take the form of a power transistor circuit producing a power output in pulsed form whose pulses correspond with the pulse train on line 122. This power output is fed on the line 126 into actuator 128. The average electrical power fed into the actuator 128 will thus depend on the instantaneous widths of the pulses received and the tool will be positioned correspondingly and thus in correspondence with the digital input signal on channel 90. The tool drive signals change discretely in value, in a manner corresponding to that of digital, or binary, signals, comprising a train of pulses having a parameter associated therewith, that is their widths, modulated in dependence upon appropriate respective values. The inertia of the actuator 128 will be sufficient to ensure that the tool position changes smoothly in spite of the pulsed form of the input. Inaccuracies due, for example, to drift of analogue signals or in the digital-to-analogue conversion process do not occur. The system of FIG. 3 is provided with tool position feedback via channel 38. Velocity feedback may also be implemented—for example by the processor 74 itself in response to the rate of change of the tool position signals on channel 38.

Figure 4:
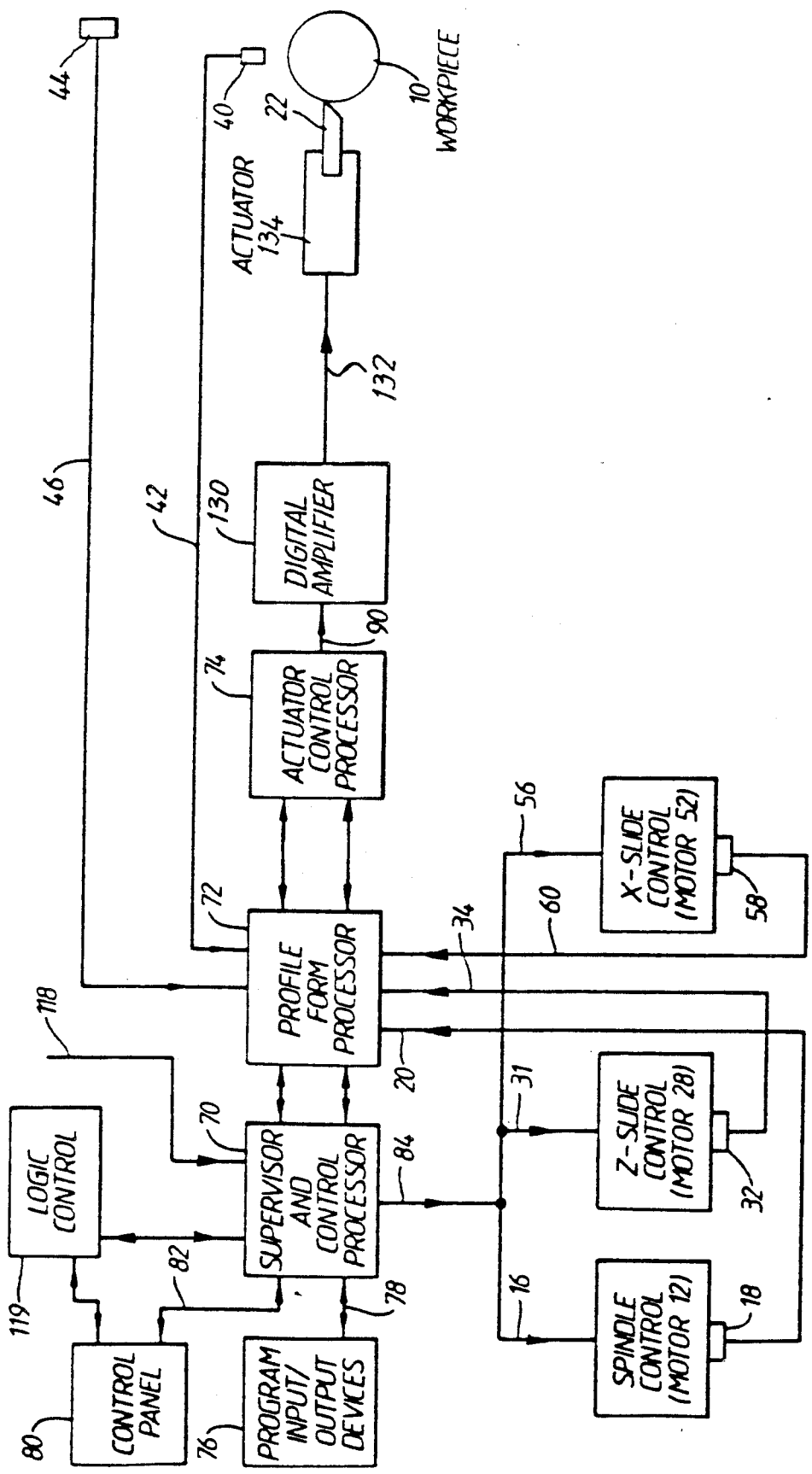
FIG. 4 is a block circuit diagram of another machine tool control system in accordance with the present invention.

In a further modified system, shown in FIG. 4, the digital output on channel 90 is fed, via a digital amplifier circuit 130, directly to the actuator 134 by a channel 132. The actuator 134 comprises an electrical stepping motor directly positioning itself and thus also the tool 22, by moving through a number of fixed steps corresponding to the digital or binary signal received. Such a system is open-loop in nature. There would be no tool position feedback or adaptive control loop. Although such a system is somewhat simpler than the systems of FIGS. 2 and 3, its accuracy is not so great.

The workpiece 10 will normally be rough-machined when it is initially fitted to the apparatus. It is therefore necessary to ensure that it is fitted in position with a known angular orientation with respect to the zero datum of the sensor 18 (that is, corresponding to zero degrees) This can be achieved by always mounting the workpiece with known orientation to, say, the vertical. For example, if the workpiece is a piston blank, it is always mounted with a particular part vertical—such as with the gudgeon or wrist pin vertical. Then rotation in the spindle is initiated and a count is made of the angular distance until the sensor 18 indicates the zero datum has been reached. This angular distance is then recorded as an offset to ensure that the profile formed on the blank is correctly orientated with respect to the blank.

A preferred design specification for the systems shown in FIGS. 2, 3 and 4 can be as follows, assuming that the workpiece to be machined is a piston blank. The design specification ensures compatability between piston profile, digital control and actuator performance.

Command signals

Assume that the profile of the blank is defined at 1° angular intervals, i.e. 359 points per revolution.

When machining the piston at a spindle rotation speed of 3333 RPM (a typical preferred value), a 1° interval occurs every 50 microsecs.

A sampling rate equal to or greater than 20 KHz is required in order to produce discrete digital signal values every 50 microsecs.

Hence command signals are generated at 50 microsec intervals using a sampling rate of 20 KHz.

Feedback (when provided)

The tool position digital feedback system has comparable performance.

At 3333 RPM, the time taken for one quarter of a revolution is 4.5 millisecs and the tool movement during that time may be up to 1 mm.

Hence for each lo of rotation the tool moves between 0 and 22, microns approximately (at peak velocity). The selected digital feedback system has a resolution of 0.4 microns.

Actuator

The actuator performance bandwidth is about 400 Hz and with reduced responsiveness up to 1000 Hz. The digital sampling rate of 20 KHz is therefore between 20 and 50 times the actuator bandwidth.

We claim:

1. A machine tool control system for machining a surface of a workpiece rotating about an axis to a predetermined profile changing in two mutually perpendicular dimensions, comprising a workpiece drive for rotating the workpiece at a speed of at least 3000 RPM, angular position sensing means for producing successive angular position signals representing respective angular positions of the workpiece, a tool for machining the workpiece and movable in a first one of said two mutually perpendicular dimensions towards and away from the workpiece and movable in the second one of said two mutually perpendicular dimensions across the surface of the workpiece, first tool drive means for moving the tool in the first dimension, second tool drive means for moving the tool in the second dimension, second dimension position sensing means for producing a succession of second dimension position signals representing respective positions of tool in the second dimension, digital data processing means having a portion for producing from input digital data fed thereto a succession of digital output signals respectively defining successive positions of the tool in the first dimension, each such digital output signal corresponding to a respective one of the angular position signals and a simultaneously existing one of the second dimension position signals, and the successively defined positions of the tool in the first dimension being the tool positions in said first dimension required for producing the said predetermined profile on the workpiece, output means responsive to the digital output signals for producing tool drive signals, and means feeding the tool drive signals to the first tool drive means for moving the tool correspondingly in said first dimension, the tool drive signals changing discretely in value, and the successive angular position signals occurring at a frequency which is between 20 and 50 times the bandwidth of the tool drive means.

2. A system according to claim 1, in which the successive angular position signals are produced at such a frequency in relation to the rotational speed of the workpiece as respectively to represent one degree angular intervals.

3. A system according to claim 1, in which said frequency of the angular position signals is of the order of 20 KHz.

4. A system according to claim 1, in which said bandwidth of the tool drive means is of the order of 400 Hz.

5. A system according to claim 1, including position feedback means sensing the instantaneous position of the tool in the first dimension and producing a position feedback signal to said portion of the data processing means.

6. A system according to claim 5, in which the feedback signals are digital signals.

7. A system according to claim 6, in which the digital feedback signals are supplied to said portion of the digital data processing means comprising parallel processing means of sufficient data processing power to respond directly and digitally to the digital feedback signals.

8. A system according to claim 5, in which said portion of the digital data processing means is arranged to provide, in response to receipt of the position feedback signals, digital velocity signals, each representative of the instantaneous velocity of the tool, such digital velocity signals to be employed as velocity feedback signals.

9. A system according to claim 5, including adaptive loop control means connected to sense changes in the transfer function between the input of said portion of the digital data processing means providing the digital output signals and the corresponding movement of the tool in the first dimension and for adjusting the effective transfer function correspondingly so as to compensate for the said changes.

10. A system according to claim 9, in which the adaptive loop control means comprises modelling means connected also to receive the digital input signals to said portion of the digital data processing means and to produce, in response to a particular value of digital input signal, a modelled output signal representing the change in tool position in the first dimension corresponding to a predetermined value for the transfer function, means for comparing the modelled output signal with the actual change in position of the tool in the first dimension in response to that value of digital input signal, and means responsive to any errors between the signals compared for producing a compensating signal for compensating for the change in the actual transfer signal as indicated by that error signal.

11. A system according to claim 9, in which the adaptive loop control means is completely digital in operation.

12. A system according to claim 1, in which that the output means comprises pulse width modulation means for producing the tool drive signals in the form of a train of pulses whose pulse widths are modulated in dependence on the respective values of the first dimension digital output signals, the first tool drive means comprising electrical drive means responsive to the average electrical power of the train of pulses for positioning the tool in the first dimension correspondingly.

13. A system according to claim 1 including digital-to-analogue converting means responsive to the first dimension output signals and means for feeding output signals from the converting means to the first tool drive means.

14. A system according to claim 13, including velocity sensing means producing an analogue signal dependent upon the instantaneous velocity of the tool in the first dimension and means feeding this analogue signal back to the means feeding output signals from the converting means to the first tool drive means.

15. A system according to claim 1 in which the first tool drive means comprises an electrical stepper motor responsive to the tool drive signals.

16. A system according to claim 1, in which the angular position sensing means provides successive angular position digital signals, and feedback means is provided for feeding the angular position digital signals to another portion of the digital data processing means.

17. A system according to claim 1, in which the second dimension position sensing means provides a succession of second dimension position digital signals, and feedback means is provided for feeding the second dimension position digital signals to another portion of the digital data processing means.

18. A system according to claim 1, including means responsive to the temperature of or adjacent to the workpiece for producing a temperature-dependent signal, and means feeding this temperature-dependent signal as an input to another portion of the data processing means for adjusting the values of at least some of the digital output signals correspondingly and as necessary to maintain the said predetermined profile for the workpiece.

19. A system according to claim 1, including means responsive to distortion of the workpiece resulting from its said rotation for producing a rotational distortion signal, and means feeding this rotational distortion signal as an input to another portion of the digital data processing means for adjusting the values of at least some of the digital output signals as necessary to maintain the said predetermined profile for the workpiece.

20. A system according to claim 1, in which the data processing means comprises data processing means configured to provide at least two separate parts operatively interconnected.

21. A system according to claim 1, in which the data processing means includes transputers.

22. A system according to claim 1, in which the data processing means employs 32-bit processing.

23. A system according to claim 1, in which the workpiece is a blank for a piston.

* * * * *